US008601500B2

(12) United States Patent
Sargent et al.

(10) Patent No.: US 8,601,500 B2
(45) Date of Patent: Dec. 3, 2013

(54) PLATFORM-INDEPENDENT SIGNAL PROCESSING

(75) Inventors: Peter G. Sargent, Ayer, MA (US); Orion W. Parrott, Sacramento, CA (US)

(73) Assignee: Raytheon Company, Waltham, MA (US)

( * ) Notice: Subject to any disclaimer, the term of this patent is extended or adjusted under 35 U.S.C. 154(b) by 547 days.

(21) Appl. No.: 12/732,588

(22) Filed: Mar. 26, 2010

(65) Prior Publication Data

US 2011/0239232 A1      Sep. 29, 2011

(51) Int. Cl.
*G06F 3/00*      (2006.01)

(52) U.S. Cl.
USPC .......................................... 719/328; 719/313

(58) Field of Classification Search
None
See application file for complete search history.

(56) References Cited

U.S. PATENT DOCUMENTS

| 5,245,347 | A | * | 9/1993 | Bonta et al. | 342/149 |
| 2002/0080756 | A1 | * | 6/2002 | Coppola et al. | 370/338 |
| 2006/0122814 | A1 | * | 6/2006 | Beens et al. | 702/189 |
| 2008/0111731 | A1 | * | 5/2008 | Hubbard et al. | 342/160 |

OTHER PUBLICATIONS

"Platform and mode independent SAR data processor based on the Extended Chirp scaling algorithm", Jesus Sanz, 2003, pp. 1-3.*

* cited by examiner

*Primary Examiner* — Tuan Dao
(74) *Attorney, Agent, or Firm* — Daly, Crowley, Mofford & Durkee, LLP

(57) ABSTRACT

In one aspect, a method includes using a processor to interface a first signal processing algorithm and a second signal processing algorithm with a platform by using an interface configured to interact with the platform and with the first and the second signal processing algorithms. The first signal processing algorithm and the second signal processing algorithm are each platform-independent.

13 Claims, 6 Drawing Sheets

PLATFORM-INDEPENDENT SIGNAL PROCESSING

BACKGROUND

Typically, algorithms used in signal processing are platform specific. Thus, to migrate from one platform to another platform requires the rewriting of the algorithms. Math libraries and other signal processing components are also typically rewritten to accommodate a new platform. Therefore, migration to other platforms requires extensive rework of the signal processing components which takes time to implement.

SUMMARY

In one aspect, a method includes using a processor to interface a first signal processing algorithm and a second signal processing algorithm with a platform by using an interface configured to interact with the platform and with the first and the second signal processing algorithms. The first signal processing algorithm and the second signal processing algorithm are each platform-independent.

In another aspect, an article includes a machine-readable medium that stores executable instructions. The instructions cause a machine to interface a first signal processing algorithm and a second signal processing algorithm with a platform by using an interface configured to interact with the platform and with the first and the second signal processing algorithms. The first signal processing algorithm and the second signal processing algorithm are each platform-independent.

In a further aspect, an apparatus includes circuitry to interface a first signal processing algorithm and a second signal processing algorithm with a platform by using an interface configured to interact with the platform and configured to interact with the first and the second signal processing algorithms. The first signal processing algorithm and the second signal processing algorithm are each platform-independent.

DETAILED DESCRIPTION

In existing signal processing architectures, algorithms, platform topology and mathematical support libraries are often coupled together in such a way that fabricating a system accommodating one of these features means that the system may not be easily modified to accommodate changes in the other features. Described herein is a framework which can be used for various different platforms. In particular, the framework focuses on isolating signal processing algorithms from platform topology (e.g., CPU/network/memory layout) by forming a universal application program interface (API) (e.g., the API 18 (FIG. 1)) that exchanges data with signal processing algorithms in a consistent way, even if the API is implemented in a different context.

Using the framework described herein, a user writes just one implementation of a particular signal processing algorithm. If the API provided by framework is used, the algorithm is usable, together with other signal processing algorithms written with the API, as a signal processor on any number of platforms supported by the framework. In essence, the framework described herein is a write-once use-everywhere approach for signal processing. Thus, the API allows for a parallel and scalable signal processor.

In one particular example, the framework offers a platform-independent approach that can be used for different platforms (e.g., different radar systems). In another particular example, the framework offers a scalable approach that can be used for radars with different missions and provides an approach for a radar product line that is more cost effective way to build radar software. While the signal processing described herein is for signal processing in a radar environment, the signal processing may be used in any signal processing environment.

Figure 1:
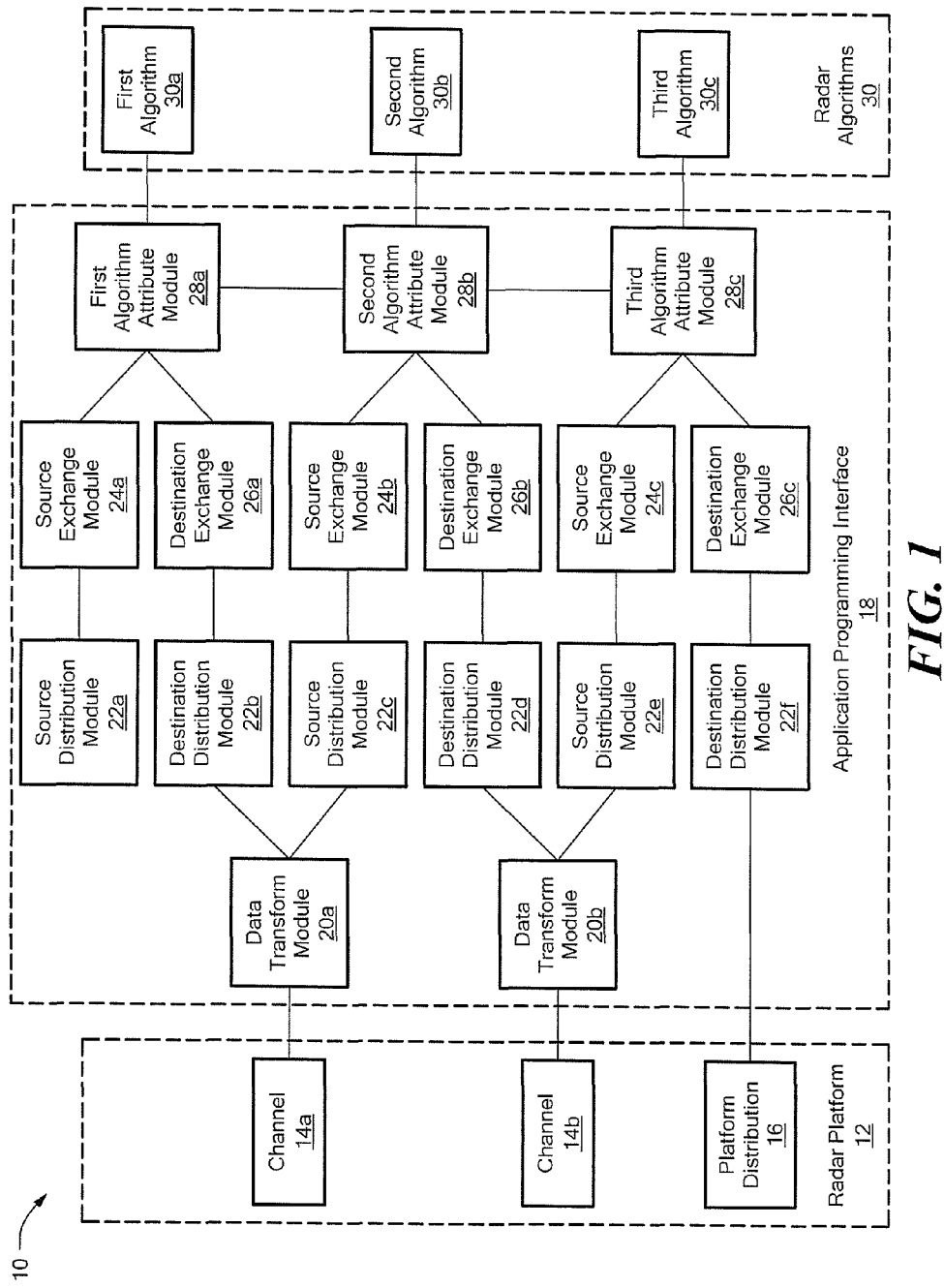
FIG. 1 is a block diagram of an example of a radar processing system including an example of an application programming interface (API).

Referring to FIG. 1, in one example, a signal processing environment is a radar processing environment 10. The radar processing environment 10 includes a radar platform 12, a collection of radar algorithms 30 and an API 18, which is the interface between the radar platform 12 and the radar algorithms 30. The radar platform 12 includes Channels objects 14a, 14b (sometimes referred to herein as a "Channel") and a Platform Distribution 16.

In one example, a Channel 14a or 14b is a block of code which implements functions used by Data Transform modules 20a, 20b and designated as Channel functions in the API specification. While a Distribution module (e.g., Distribution modules 22a-22f) defines platform-independent characteristics of signal processing (i.e., matrix) data, the Channel 14a or 14b uses platform-specific routines to convert actual data into a format suitable for transportation on that platform, open a communications port (e.g., network sockets, message queues and so forth), send the data on that port, receive it on the other end of that port and reconstitute the data on the receiving end. The Channel 14a or 14b is responsible for transmitting the data, and is also responsible for handling transformations. The Channel 14a or 14b also performs platform-specific format changes (e.g., big endian to little endian memory layouts) and also reorganizes data (e.g., transposing the data when the API 18 provides it in X-Y format and request the result in Y-X format).

In one example, the radar algorithms 30 (e.g., a first algorithm 30a, a second algorithm 30b and a third algorithm 30c) are independent mathematical functions with numeric vector inputs and outputs, for example, Doppler processing and pulse compression. In one example, the output of one such algorithm is the basis for the input of the next algorithm. However, the data may require reorganization (e.g., a matrix transposition or zero padding), transportation across some communications infrastructure to a different processor which is running the recipient algorithm, or both. By using the API 18, the radar algorithms 30 provide the information necessary for the API to determine the sequence of actions required to transform and transport the data. The API 18 then executes these actions, passing the data from the output of one algorithm (e.g., algorithm 30a) to the appropriate Channel (e.g., Channel 14a) and to the recipient algorithm (e.g., algorithm 30b).

The API 18 includes algorithm attribute modules (e.g., a first algorithm attribute module 28a, a second algorithm attribute module 28b and a third algorithm attribute module 28c) used to link the algorithms 28 together. The API 18 also includes Exchange modules (sometimes referred to herein as "Exchanges" and include, for example, Source Exchange modules 24a-24c and Destination Exchange modules 26a-26c) that are used to link inter-algorithm data transfers. The API 18 further includes Data Transform modules 20a, 20b and Distribution modules 22a-22f, which reference platform specific components such as the channels 14a, 14b and platform distribution 16. The Data Transform modules 20a, 20b also link intra-algorithm data transfers.

While Distribution modules 22a-22f are a platform-independent abstraction, a Platform Distribution module 16 is a platform-specific implementation of that concept that performs functions defined by the Distribution modules 22a-22f, but like the Channel 14a or 14b, the contents of this module changes from one platform to the next so long as its interfaces remain consistent with the subset of the API 18 defined by the Distribution modules 22a-22f. However, the Platform Distribution module 16 from any platform may be used with the API 18.

In one example, the Exchange modules 24a-24c, 26a-26c are class objects that link together Data Transform modules 20a, 20b and Distribution modules 22a-22f. The Exchange modules 24a-24c, 26a-26c also describe which signal processing algorithm will be executed at a particular place in the processing sequence and which Data Transform modules 20a, 20b to use. Distribution modules 22a-22f describe either the output or input memory layout of a particular signal processing algorithm 30a-30b. Data Transform modules 20a, 20b describe how the output Distribution module of one algorithm maps to the input Distribution module of another algorithm.

Figure 2:
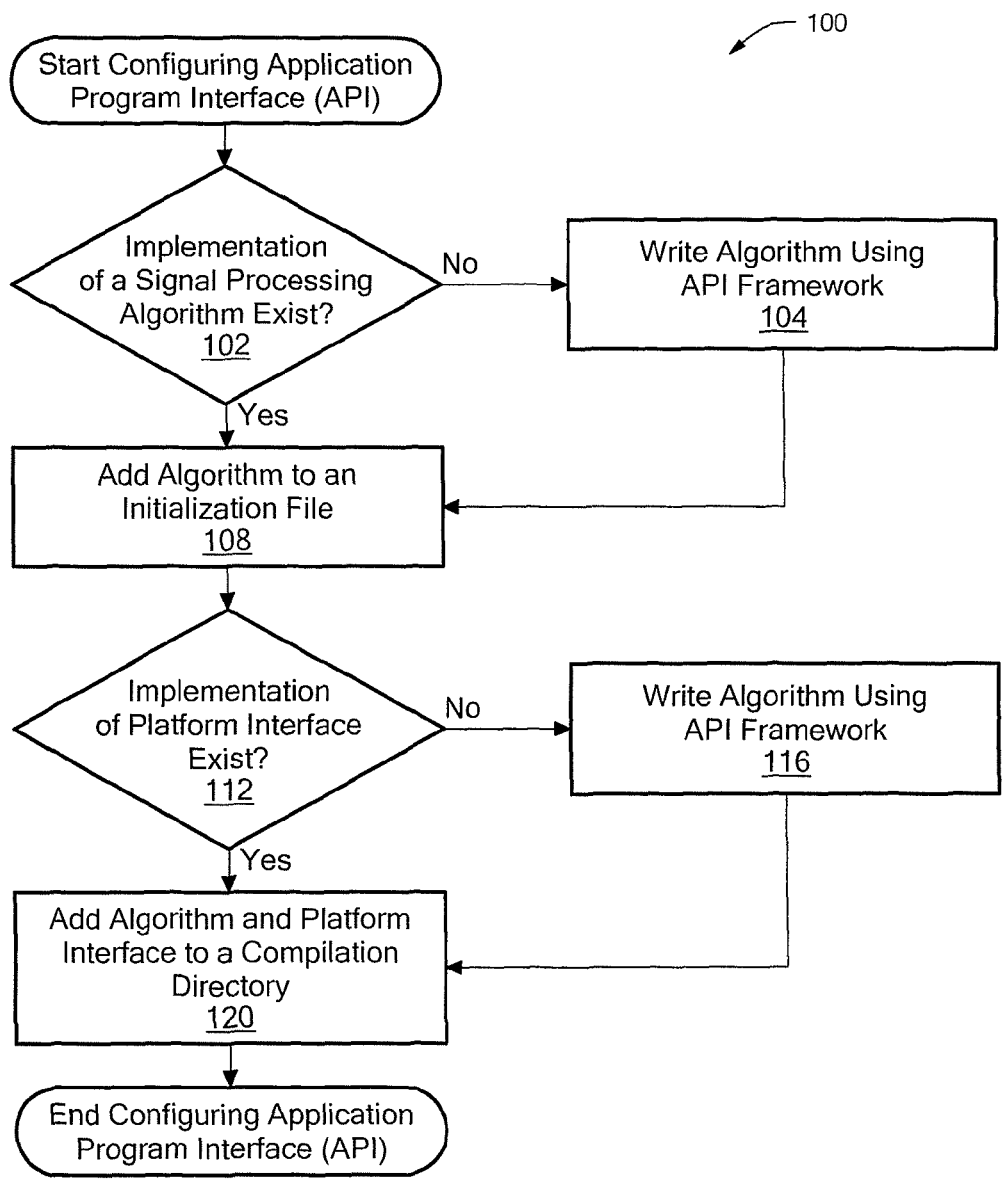
FIG. 2 is a flowchart of a process used to configure the API of FIG. 1.

Referring to FIG. 2, an example of a process to configure the API 18 for a particular signal processing application is a process 100. In one example, the process 18 is performed by a user. In other examples, configuration is performed automatically without user intervention.

It is determined if there exists an implementation of a signal processing algorithm (102). There are many signal processing algorithms, such as Doppler processing, which are performed in similar ways across different sensors. If a user were to implement such an algorithm using the API 18, that implementation would be available to developers of other sensors who are also using the API 18. Therefore, a given signal processing algorithm is written into software once using the API 18 and added to a library that other developers can search.

If there is not an existing implementation of a signal processing algorithm, then the algorithm is written (104). In one example, a developer writes the algorithm. In one particular example, existing code is used and adapted for use with the API 18.

The algorithm is added to an initialization file (108). Once an algorithm is found or written conforming to the API 18, an initialization section for that algorithm is added to the initialization file which ensures that upon startup, the API 18 reserves the necessary memory and when to call that algorithm.

It is determined whether an implementation of platform interface exists (112). The API 18 may be run on any number of computing platforms and includes a high level model of how the data from various signal processing algorithms is moved around in memory. This model uses a standard interface to call memory management software written for a particular platform. Multiple such memory managers might exist, one for each platform of interest, and they can all be used with the API 18 if they use the same interface to service requests for data movement. Similar to that of developing the signal processing algorithms previously described, if a developer is interested in deploying the signal processing application on a particular platform (e.g., an IBM 595), the developer determines if there is already a memory manager written for that platform which is compatible the API 18. If not, then such a manager is written which can be used by future developers for other projects.

If the platform interface does not exist, a platform interface using the API framework is written (116). The algorithm and platform interface are added to a compilation directory (120). The compilation directory is the directory where code is compiled. In one example, the code may originate from three different source directories: a directory including the radar platform code 12; a directory including the radar algorithms 30; and a directory including the API 18. So long as the code remains compliant with the API 18, the code may be worked on separately so that to build a complete signal processor requires copying the appropriate code to the compilation directory and compiling the appropriate code. The API framework code is installed in a particular directory, which is controlled by a configuration file and includes sub-directories specifically reserved by an API installer for the purpose of these functions.

Figure 3:
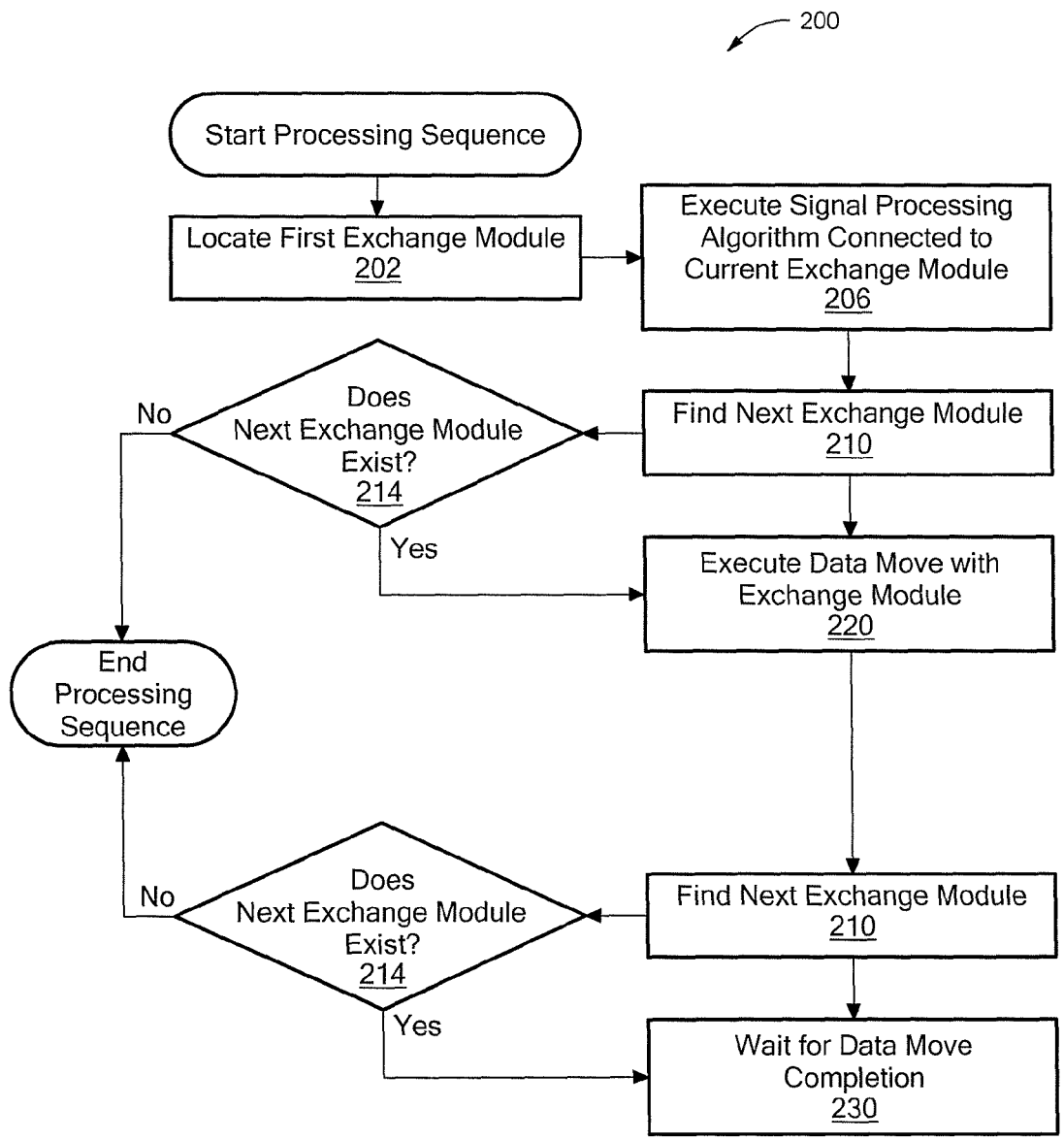
FIG. 3 is a flowchart of a process used in sequence processing.

Referring to FIG. 3, a process 200 is an example of events that occur during radar input processing. Process 200 describes a single processing cycle and begins every time the API 18 receives a set of radar data and finishes after the API 18 has performed a filter and a data movement functions for that data set. In one example, the processing alternates between signal processing and data movement. The API 18 runs a data set through a signal processing algorithm, moves the resulting data into the next memory layout, and runs the resulting data set on the next signal processing algorithm. The data movement processing steps includes a sequence of Exchange modules 24a-24c, 26a-26c.

The first Exchange instance is located (202). The first Exchange provides the first signal processing algorithm, the location of its input memory, and the action(s) to be taken to ensure that the appropriate data set is loaded into that memory location. The signal processing algorithm is then executed and the next Exchange instance is found in order to perform the necessary memory movement and move on to the next signal processing algorithm. The first Exchange does not receive its input from another Exchange; but rather, it comes from a source outside of the API 18, such as a network connection, for example.

The signal processing algorithm connected to a current Exchange is executed (206). Exchange modules 24a-24c, 26a-26c are initialized as a result of an initialization sequence. When a signal processing algorithm is added to the initialization file, the API 18 requests an Exchange module to handle the data preparation for that algorithm. When that Exchange module is executed, it references the link to the appropriate algorithm and executes it. Once the signal processing algorithm is finished, the API 18 moves on to the next Exchange module and execute it.

It is determined whether a next Exchange module exists (214). For example, there may not be another Exchange module, which indicates that this instance of the API 18 is complete with processing for this data set.

If the Exchange module exists, a data move is executed with the Exchange module (220). Once the next Exchange module is found, it provides links to the appropriate Channel class object 14a, 14b for the data movement between the Source Distribution module (e.g., Source Distribution modules 22a, 22c, 22e) and the Destination Distribution module (e.g., Destination modules 22b, 22d, 22f). The Source Distribution modules 22a, 22c, 22e and the Destination Distribution modules 22b, 22d, 22f are paired with the Source Exchange modules 24a-24c and the Destination Exchange modules 26a-26c. These are not unique types, but rather roles. The Source Distribution modules 22a, 22c, 22e and Destination Distribution modules 22b, 22d, 22f include identical logic. Their roles are identified solely by their relationship to other classes or objects. In some examples, an individual Distribution instance serves both roles, depending upon which Exchange is active in the current stage of execution.

A search for a next Exchange module is performed (214). In one example, there may be multiple instances of the API 18 running at one time and operating on the same global data set so that each instance runs in parallel with the other instances. The instances may each have their own discrete subdivision of the global data set or they may share overlapping sections of that data set. The Exchange module performs the synchronization needed between these instances. For example, suppose there are N instances of the API 18 that have subdivided a global data set into N discrete subdivisions. The instances simultaneously execute the same signal processing algorithm on their subdivision.

As a result, the instances cannot continue with execution of the next signal processing algorithm until the instances have completed computation on the current algorithm. Each instance completes its local computation and sends the data on. The instances find the next Exchange module and wait for the data movement to be completed. In some cases this may mean that each instance of the API 18 waits for the completion of the data movement initiated by that API 18. However, in most cases it will mean that each instance of the API 18 waits for the completion of the data movement of the instances of the API 18. This behavior may change from one algorithm to the next algorithm. The selection of which behavior a particular Exchange module uses is performed as a part of the initialization for the algorithm in the initialization file which was described above. It is implemented, for example, by the platform software wrapper layer written to be compatible with the API framework.

Not all instances of the API 18 may be involved in every signal processing algorithm. For example, suppose that there are three signal processing algorithms: A, B and C. The data set for A is divided into ten discrete subdivisions, but the data set for B is divided into five discrete subdivisions and the data set for B is divided again into ten subdivisions. Exchange modules, which describe the transition from A to B, coalesce the data into larger subdivisions and the Exchange modules which describe the transition from B to C re-divide the data again. Thus, the processing is divided across ten instances of the API 18, but that five of them are idle during the processing for algorithm B. This can be accomplished by leaving the initialization for algorithm B out of the initialization file for those instances of the API 18. When the instances find the next Exchange module after completion of algorithm A, they find the Exchange module which describes the beginning of algorithm C. This Exchange module forces those instances of the API 18 to become idle until they receive the output of algorithm B.

It is determined whether a next Exchange module exists (214). If the next Exchange module exists, the next Exchange module waits for data move completion (230). For example, the previous Exchange module began the data move and the next Exchange module begins by waiting for the data move to complete since the data movement may occur asynchronously to the API 18 execution. This may occur, for example, when the platform memory management software runs on a separate processor (e.g., direct memory access (DMA)) or using a separate thread of execution. This may also occur when there are multiple instances of the API 18.

Figure 4:
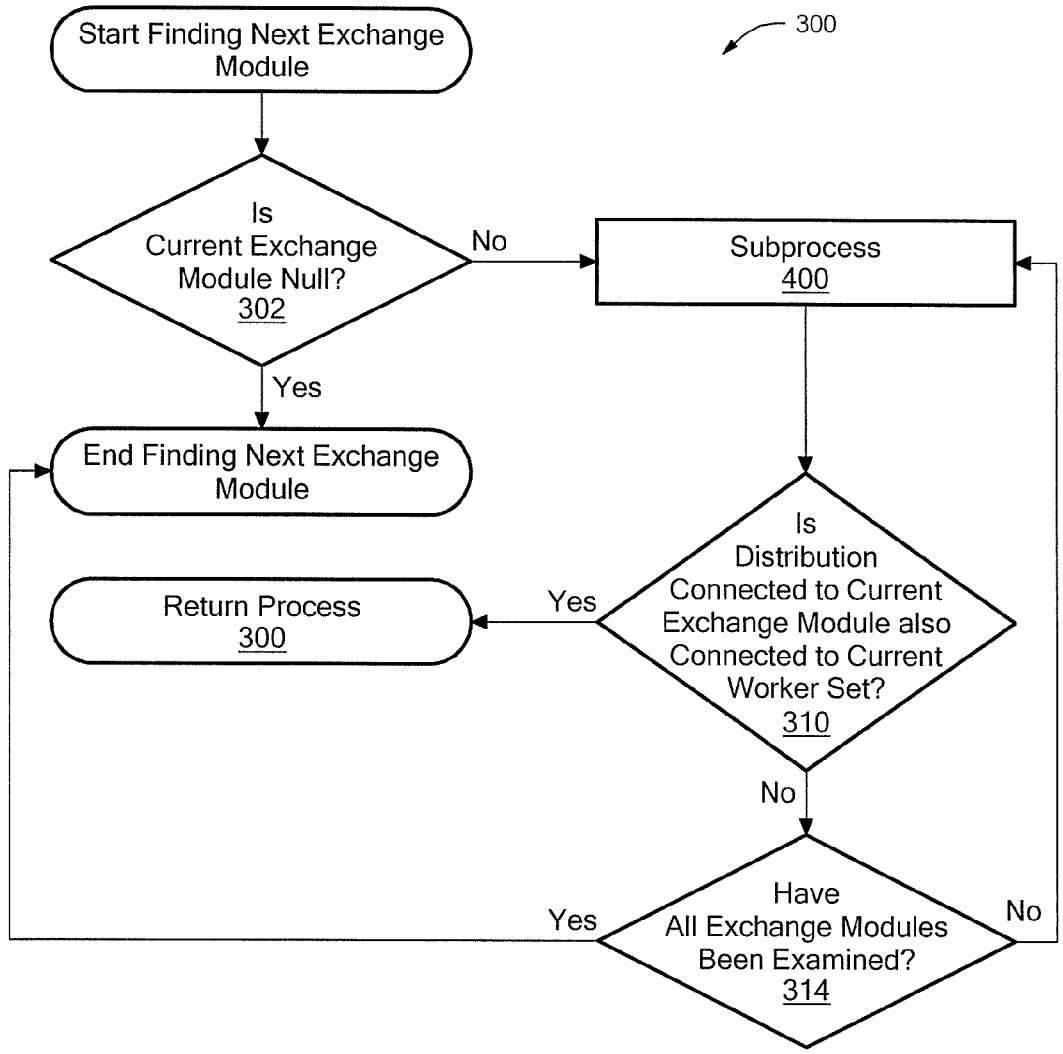
FIG. 4 is a flowchart of an example of a process to find a next Exchange used in the process in FIG. 3.

Referring to FIG. 4, one example of performing processing block 210 to find the next Exchange module is a process 300. It is first determined whether a current Exchange module is null (302). For example, the next Exchange module is found if the API 18 has completed processing of a previous Exchange module, or if a startup Exchange module has been found. Under some circumstances, the pointer to the current Exchange module may be null and in these cases processing is assumed complete for this data set. If the current exchange is not null, a process 400 is performed to find the next exchange (see FIG. 5).

It is determined if the Distribution module connected to the current Exchange module is also connected to a current worker set (310). Several instances of the API 18 may be running concurrently and share the same global data set. However, not all such instances may be involved in all calculations on that data set. Each instance of the API 18 is called a Worker and is represented by a Worker class object. Workers are members of Worker Sets and Worker Sets are attached to Exchange modules. If the current Worker accesses an Exchange module and determines that it is not a part of that Exchange's Worker Set, then it finds the next Exchange module. It proceeds in this iterative fashion until it finds an Exchange module of which it is a part. It then waits until the instances of the API 18 which participate in antecedent Exchange modules have completed processing for those Exchange modules.

It is determined if all the Exchange modules have been analyzed (314). For example, if the current instances of the API 18, or Worker, has iterated through all of the Exchange modules for which it is a member then it is assumed that processing is complete for that Worker.

Figure 5:
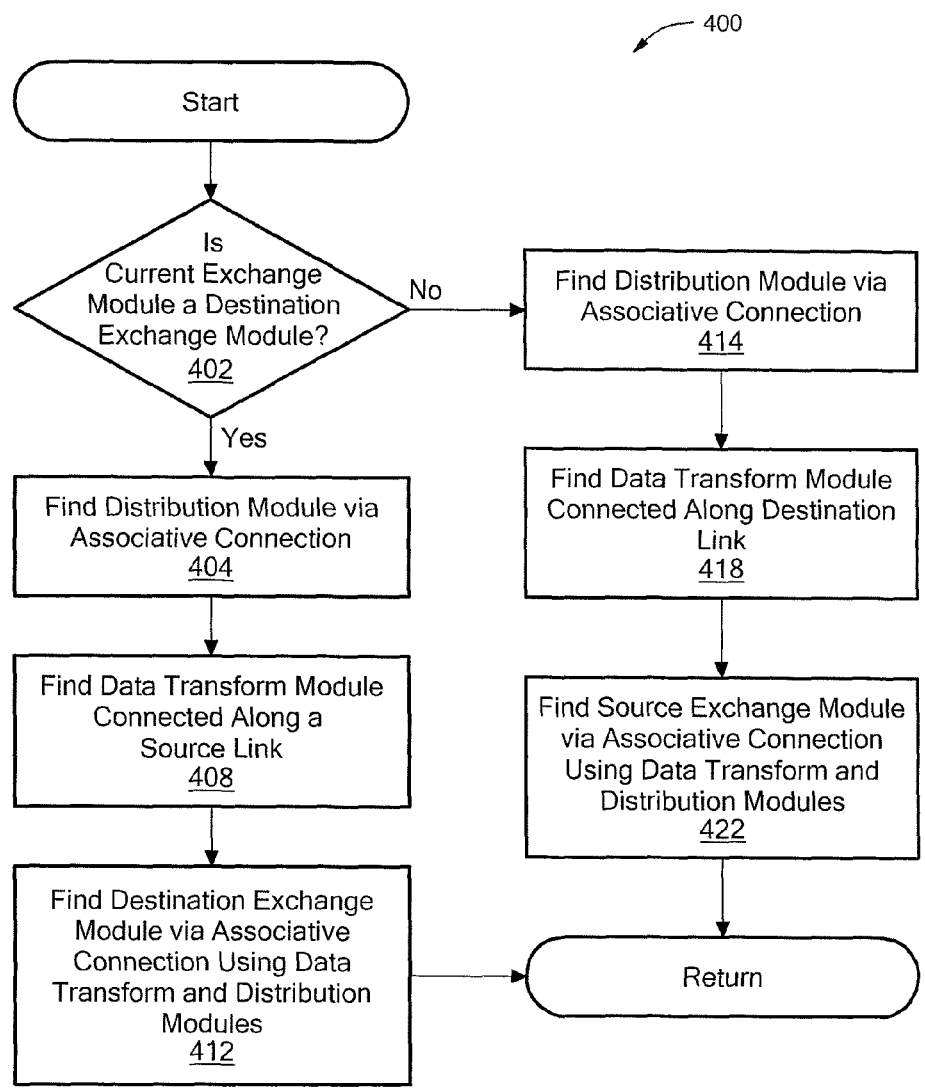
FIG. 5 is a flowchart of an example of a subprocess of the process in FIG. 4.

Referring to FIG. 5, the subprocess 400 relies on the associative class relationship between the Exchange modules 24a-24c, 26a-26c and Distribution modules 22a-22f and the Data Transform modules 20a, 20b. In order to find the next Exchange module, the API 18 determines the type of the current Exchange module and then follows the associative relationships among the Exchange, Distribution and Data Transform modules.

It is determined whether a current Exchange module is a Destination Exchange module (402). If the current Exchange module is not a Destination Exchange module 26a-26c, the Distribution module is found via an associative connection (414). The associative connection defines a role of the Distribution module within the current stage of processing. In one example, the Distribution modules are of the same class and include identical logic. Depending upon the configuration chosen by a user assembling a signal processor, a given Destination instance may serve both roles, but for different Data Transform modules (e.g., the Source Distribution module 22a and the Destination Distribution module 22b may be separate Distribution instances, but Destination Distribution module 22b and Source Distribution module 22c could be the same instance). Because the role played by the Distribution modules 22a-22f are included in the Exchange type and not the Distribution or the Data Transform modules, the link between the Exchange module and the Distribution module is called an associative connection, because it describes the association between the Distribution module and the Data Transform module.

The Data Transform module connected along a destination link is found (418). The Source Exchange module is found via the associative connection using the Data Transform modules and the Distribution module (422).

If the current Exchange module is a Destination Exchange module, the Distribution module is found via an associative connection (404). The Data Transform module is found along a source link (408) and the Destination Exchange via the associative connection is found using the Data Transform module and the Distribution module (412).

Figure 6:
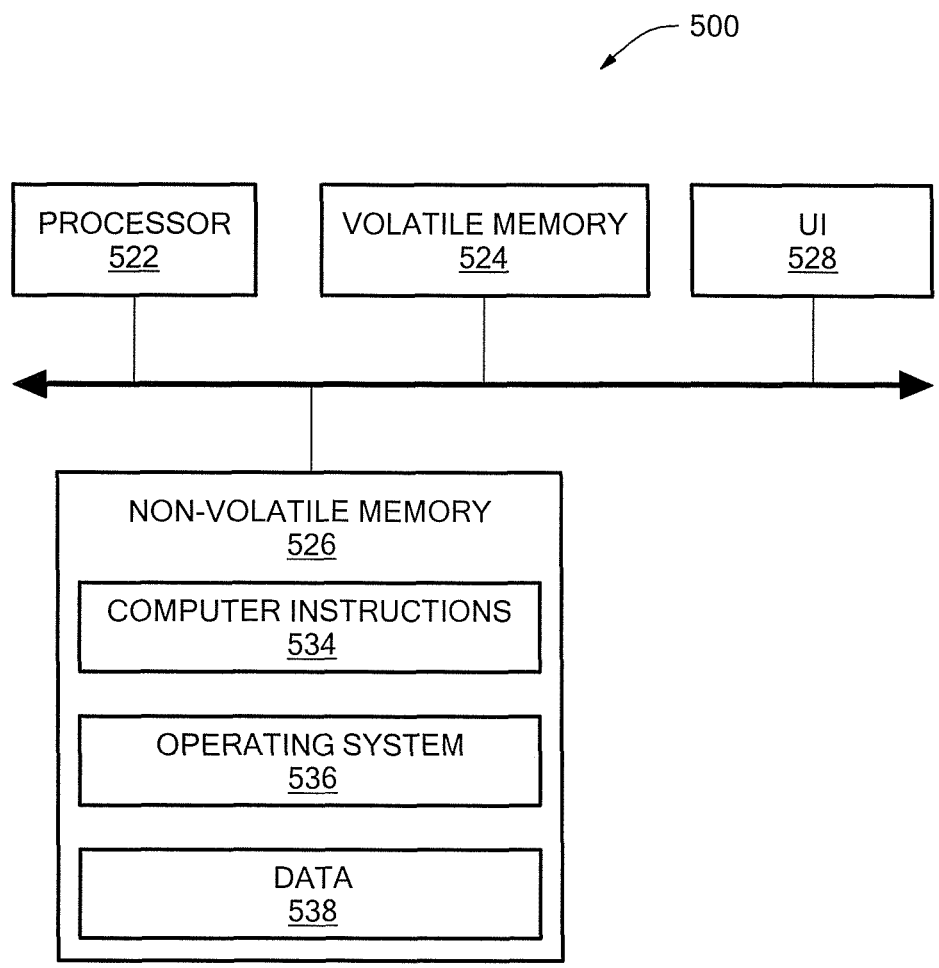
FIG. 6 is a block diagram of an example of a computer used to execute any of the processes in FIGS. 2 to 5.

Referring to FIG. 6, a computer such as a computer 500 may be used to execute one or more of the processes 100-400. The computer 500 includes a processor 522, a volatile memory 524, a non-volatile memory 526 (e.g., hard disk) and a user interface (GUI) 528 (such as a keyboard, a mouse, a monitor or a touch screen or any combination thereof). Non-volatile memory 526 includes an operating system 536, data 538 and computer instructions 534 which are executed out of volatile memory 524 to perform all or part of the processes described herein (e.g., processes 100-400).

The processes described herein are not limited to the specific embodiments described herein. For example, the processes are not limited to the specific processing order of FIGS. 2 to 5. Rather, any of the blocks of FIGS. 2 to 5 may be re-ordered, combined or removed, performed in parallel or in serial, as necessary, to achieve the results set forth above.

The modules described herein (e.g., the Data Transform modules 20a, 20b, The Distribution modules 22a-22f, the Source Exchange modules 24a-24c, the Destination Exchange modules 26a-26c, the algorithm attribute modules 28a-28c and so forth) may be embodied in software or hardware or any combination thereof. In one example, one or more of the modules are implemented in an application-specific integrated circuit (ASIC). In another example, one or more of the modules are implemented in circuitry. In a further example, one or more of the modules are implemented in a field-programmable gate array (FPGA).

Processes 100-400 are not limited to use with the hardware and software of FIG. 6; rather they may find applicability in any computing or processing environment and with any type of machine or set of machines that is capable of running a computer program. Processes 100-400 may be implemented in hardware, software, or a combination of the two. Processes 100-400 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processes 100-400 and to generate output information.

The system may be implemented, at least in part, via a computer program product, for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processes 100-400.

The system described herein is not limited to use with the hardware and software described above. The system may be implemented in digital electronic circuitry, or in computer hardware, firmware, software, or in combinations thereof.

Elements of different embodiments described herein may be combined to form other embodiments not specifically set forth above.

What is claimed is:

1. A method, comprising:
    using a processor to interface a first radar signal processing algorithm and a second radar signal processing algorithm with a first radar platform by using an interface configured to interact with the radar platform and with the first and the second radar signal processing algorithms; and
    using the processor to interface the first and second radar signal processing algorithms with a second radar platform without altering the first or second radar signal processing algorithms,
    wherein the first signal radar processing algorithm and the second radar signal processing algorithm are each radar platform-independent,
    wherein using the processor to interface the first and second radar signal processing algorithms with the first radar platform comprises:
    using distribution modules to link the first radar platform;
    using data transform modules to link intra-algorithm data transfers of the first and second radar signal processing algorithms; and
    using exchange modules to link inter-algorithm data transfers between the first and second radar signal processing algorithms.

2. The method of claim 1 wherein using the processor to interface the first and second radar signal processing algorithms with the first radar platform further comprises using exchange modules to link the data transform modules and the distribution modules.

3. The method of claim 2 wherein using the processor to interface the first and second radar signal processing algorithms with the first radar platform further comprises using exchange modules to:
    determine processing sequence of the first and second radar signal processing algorithms; and determine which data transform modules to use.

4. The method of claim 1, further comprising using the exchange modules to synchronize instances of the interface.

5. An article comprising:
    a non-transitory machine-readable medium that stores executable instructions, the instructions causing a machine to:
    interface a first radar signal processing algorithm and a second radar signal processing algorithm with a first platform by using an interface configured to interact with the radar platform and with the first and the second radar signal processing algorithms; and
    interface the first and second radar signal processing algorithm with a second radar platform without altering the first or second signal radar processing algorithms,
    wherein the first radar signal processing algorithm and the second radar signal processing algorithm are each radar platform-independent, wherein the instructions causing the machine to interface the first and second radar signal processing algorithms with the first radar platform comprises instructions causing the machine to:

use distribution modules to link to the first radar platform;

use data transform modules to link intra-algorithm data transfers of the first and second radar signal processing algorithms; and use exchange modules to link inter-algorithm data transfers between the first and second radar signal processing algorithms.

6. The article of claim 5 wherein the instructions causing a machine to interface the first and second radar signal processing algorithms with the first radar platform further comprises instructions causing a machine to use exchange modules to link the data transform modules and the distribution modules.

7. The article of claim 6 wherein the instructions causing a machine to interface the first and second radar signal processing algorithms with the first radar platform further comprises instructions causing a machine to use exchange modules to:

determine processing sequence of the first and second radar signal processing algorithms;

and determine which data transform modules to use.

8. The article of claim 5, further comprising instructions causing a machine to use the exchange modules to synchronize instances of the interface.

9. An apparatus, comprising:

hardware circuitry configure to:

interface a first radar signal processing algorithm and a second radar signal processing algorithm with a first radar platform by using an interface configured to interact with the radar platform and configured to interact with the first and the second radar signal processing algorithms; and interface the first and second radar signal processing algorithms with a second radar platform without altering the first or second radar signal processing algorithms, wherein the first radar signal processing algorithm and the second radar signal processing algorithm are each radar platform-independent, wherein the circuitry to interface the first and second radar signal processing algorithms with the first radar platform comprises hardware circuitry to:

use distribution modules to link to the first radar platform;

use data transform modules to link intra-algorithm data transfers of the first and second radar signal processing algorithms; and use exchange modules to link inter-algorithm data transfers between the first and second radar signal processing algorithms.

10. The apparatus of claim 9 wherein the circuitry comprises at least one of a processor, a memory, programmable logic device and logic gates.

11. The apparatus of claim 9 wherein the circuitry to interface the first and second radar signal processing algorithms with the first radar platform further comprises hardware circuitry to use exchange modules to link the data transform modules and the distribution modules.

12. The apparatus of claim 11 wherein the circuitry to interface the first and second radar signal processing algorithms with the first radar platform further comprises circuitry to use exchange modules to:

determine processing sequence of the first and second radar signal processing algorithms;

and determine which data transform modules to use.

13. The apparatus of claim 9, further comprising hardware circuitry to use the exchange modules to synchronize instances of the interface.

* * * * *